(12) United States Patent
Cabrera et al.

(10) Patent No.: US 6,684,231 B1
(45) Date of Patent: Jan. 27, 2004

(54) MIGRATION OF FRIENDLY VOLUMES

(75) Inventors: Luis Felipe Cabrera, Bellevue, WA (US); Catharine van Ingen, Berkeley, CA (US); Norbert P. Kusters, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/451,220

(22) Filed: Nov. 29, 1999

(51) Int. Cl.$^7$ .............................. G06F 17/30
(52) U.S. Cl. ..................................... 707/205
(58) Field of Search ................ 707/1, 2, 4, 7, 707/10, 100–102, 104.1, 200, 202–206; 709/100–102, 310, 328; 711/100, 101, 111–115, 154, 161, 162, 165, 170, 173; 714/1–7, 15

(56) References Cited

U.S. PATENT DOCUMENTS

| | | | |
|---|---|---|---|
| 4,633,393 A | * 12/1986 | Rundell | 707/7 |
| 5,247,660 A | * 9/1993 | Ashcraft et al. | 707/205 |
| 5,283,894 A | * 2/1994 | Deran | 707/1 |
| 5,313,617 A | * 5/1994 | Nakano et al. | 703/24 |
| 5,579,516 A | * 11/1996 | Van Maren et al. | 707/1 |
| 5,794,236 A | * 8/1998 | Mehrle | 707/3 |
| 5,819,296 A | * 10/1998 | Anderson et al. | 700/79 |
| 5,832,522 A | * 11/1998 | Blickenstaff et al. | 707/10 |
| 5,990,892 A | * 11/1999 | Urbain | 345/853 |
| 6,075,939 A | * 6/2000 | Bunnell et al. | 717/107 |
| 6,161,111 A | * 12/2000 | Mutalik et al. | 705/42 |
| 6,311,179 B1 | * 10/2001 | Agarwal et al. | 707/2 |
| 6,330,572 B1 | * 12/2001 | Sitka | 707/100 |
| 6,405,284 B1 | * 6/2002 | Bridge | 711/114 |
| 2001/0044807 A1 | * 11/2001 | Kleiman et al. | 707/203 |

OTHER PUBLICATIONS

"XFS: A Next Generation Journalled 64–Bit Filesystem With Guaranteed Rate I/O", http://www–europe.sgi.com/Technology/xfs–whitepaper.html, Silicon Graphics—XFS White Paper, 1–20, (Mar. 15, 1999).

* cited by examiner

Primary Examiner—Greta Robinson
Assistant Examiner—Harold E. Dodds, Jr.
(74) Attorney, Agent, or Firm—Merchant & Gould P.C.

(57) ABSTRACT

Systems and methods for performing an on-demand determination of a correct set of volumes to be exported are described. A disk platter is defined to be the unit of volume migration. Volumes are added to the platter based on whether or not the volume coexists on a disk containing a volume to be exported.

13 Claims, 4 Drawing Sheets

MIGRATION OF FRIENDLY VOLUMES

RELATED APPLICATIONS

This application is related to the following applications, all of which are filed on the same day and assigned to the same assignee as the present application:

"Quorum Resource Arbitrator Within a Storage Cluster"—U.S. patent application Ser. No. 09/449,579, "Storage Management System Having Common Volume Manager"—U.S. patent application Ser. No. 09/449,577, "Storage Management System Having Abstracted Volume Providers"—U.S. patent application Ser. No. 09/450,364, "Volume Configuration Data Administration"—U.S. patent application Ser. No. 09/451,300.

"Volume Stacking Model"—U.S. patent application Ser. No. 09/451,219.

FIELD OF THE INVENTION

This invention relates generally to computer data storage systems, and more particularly to migrating volumes in a data storage system.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright □ 1999 Microsoft Corporation, All Rights Reserved.

BACKGROUND OF THE INVENTION

As computer systems have evolved so has the availability and configuration of data storage devices, such as magnetic or optical disks. For example, these storage devices can be connected to the computer system via a bus, or they can be connected to the computer system via a wired or wireless network. In addition, the storage devices can be separate or co-located in a single cabinet.

A storage volume is a software abstraction of the underlying storage devices and is commonly the smallest self-contained unit of storage exposed by an operating system and administered by a file system. Storage volumes abstract the physical topology of the storage devices and may be a fraction of a disk, a whole disk or even multiple disks that are bound into a contiguous range of logical blocks.

Volumes are constructed from one or more extents, with each extent being a contiguous storage address spaces presented by the underlying storage device. An extent is typically characterized by the size of the address space and a starting offset for the address space from a base of the media. Volume mapping is the process of mapping the contiguous address space presented by the volume onto the usually non-contiguous storage address spaces of the underlying extents. Volume mappings are either implemented on a specialized hardware controller, referred to as a hardware volume provider, or in software by a software volume provider.

Volume mappings may be used to increase the fault tolerance, performance, or capacity characteristics of the underlying storage devices. For example, a technique for improving fault tolerance, known as mirroring or plexing a disk, uses multiple disks. When data is written to one disk the data is also written to a second disk; thus the second disk is a "mirror image" of the first disk. If one disk should fail the other disk is still available for use and has an exact copy of the information on the first disk.

In addition RAID numbers are often used to identify storage volume mappings. A RAID, or Redundant Array of Independent Disks, provides the ability to lose an extent without losing volume data. Access to the volume may be slower or more costly, but is not interrupted by the failure of the underlying extent. RAID1 implements mirroring. RAID3 and above all implement some sort of stripe with parity scheme; the different number indicates the arrangement of the data and check-data (or parity) extents. Striping is a mechanism where data for a file or file system is distributed among several different disks.

Volume providers commonly group logical volumes into what are known as "diskpacks" in order to simplify volume management. The diskpack then is a collection of logical volumes and the underlying disks. Diskpacks provide transitive closure for the volumes contained in the disk pack and may provide group sanity checking to ensure volume configuration correctness.

Occasionally, it is necessary to "migrate" a volume from one diskpack to another. An example of a situation in which migration is required occurs when data is being partitioned among servers. Other examples include the replicating the data in order to perform a parallel analysis (e.g., data mining), or archiving the data.

Therefore, there is a need in the art for a-system to perform volume migration. The system should preserve transitive closure of the migrated volumes, that is, the migration, or export, should preserve relationships that exist both within a volume, and between volumes. In addition, the system should automatically determine the disks or other components of the storage system that must be included in order to successfully migrate the volume. Finally, the system should implement a flexible unit of transfer for migrating volumes between diskpacks and between computer systems.

SUMMARY OF THE INVENTION

The above-mentioned shortcomings, disadvantages and problems are addressed by the present invention, which will be understood by reading and studying the following specification.

In one such system for migrating a volume from a source diskpack to a receiving diskpack, an export application communicates with a logical volume provider to automatically determine the minimal subset of disks, volumes and volume extents of the source diskpack that should be included in the export such that transitive closure is preserved. This minimal subset is referred to as a platter. The logical volume subsystem can be a hardware provided subsystem or it can be implemented as a software component. The logical volume subsystem, at the direction of the export application, causes the disks in the platter to be removed from the source diskpack and associated with the receiving diskpack.

In one method used to migrate a volume or set of volumes between diskpacks, a program executing the method receives an identifier for a volume that is to be exported. The method then searches the disks containing the identified volume extents for extents belonging to other volumes (friend volumes). The disks on which the friend volumes reside are added to the platter. The method then recursively searches for further volume extents on disks occupied by the friend volumes. The method proceeds in this manner until no new disks are discovered. The platter is then exported from the source-diskpack and imported into the receiving diskpack.

In an alternative method, the volume extents on the diskpack are placed on alternative disks in a manner that minimizes the number of friend volumes, thereby reducing the number of disks in the platter.

The volume migration system and method summarized above, and various other aspects of the system will be described in detail in the next section.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. In the first section, the hardware and the operating environment in conjunction with which embodiments of the invention may be practiced are described. In the second section, a system level overview of the invention is presented. In the third section, methods of an exemplary embodiment of the invention are provided. Finally, in the fourth section, a conclusion of the detailed description is provided.

Hardware and Operating Environment

Figure 1:
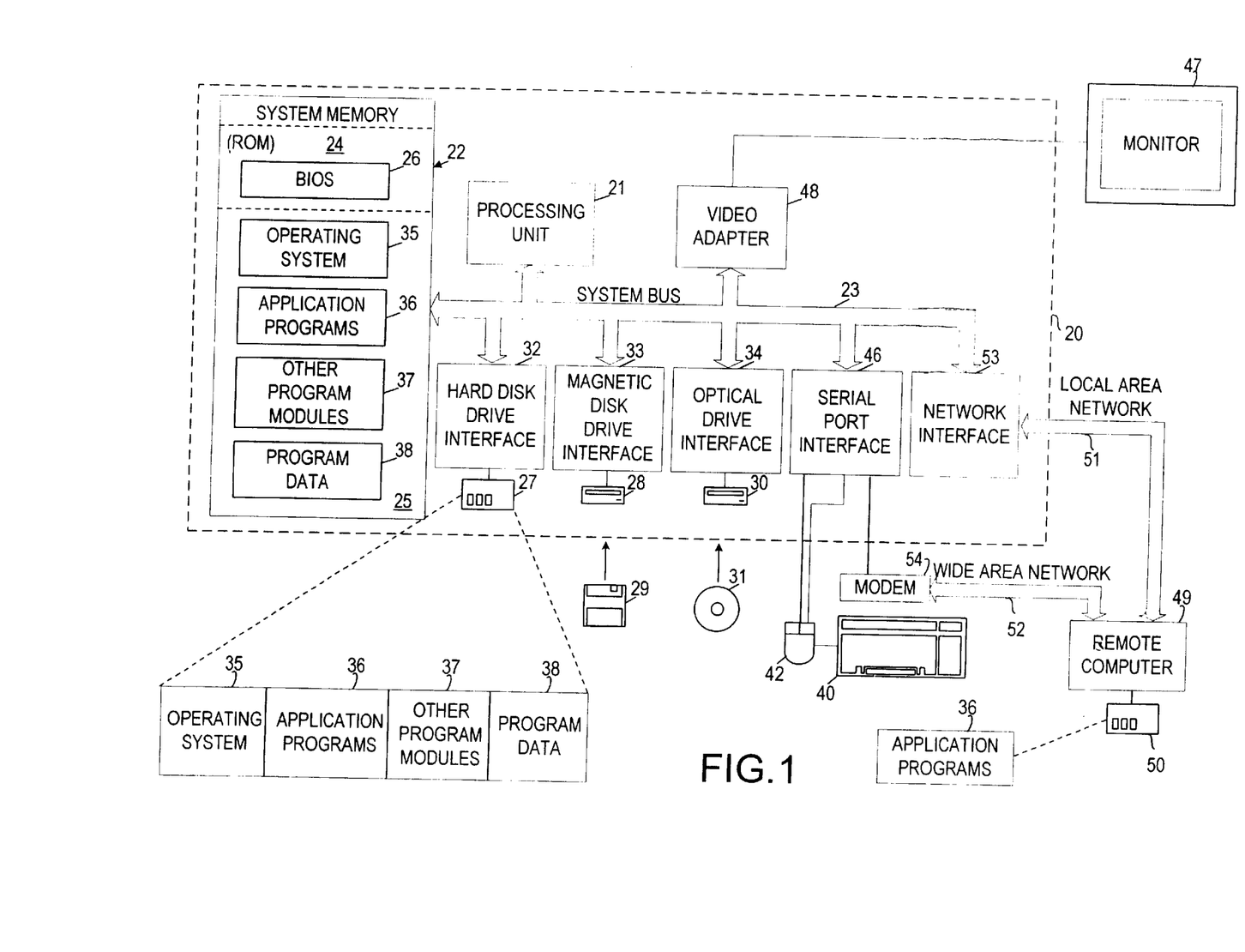
FIG. 1 shows a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 11. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

Definitions

This section presents definitions of terms used in the detailed description. Some of the terms are in common usage in the art, while others are specific to the invention.

Compromised—a status indicating that a fault tolerant volume is missing one or more disk or volume extents; for example, a mirror set with only one mirror currently available.

Configuration data—describes the mapping of physical resources to logical volumes.

Directed configuration—procedure whereby a provider is explicitly provided with rules for choosing logical block remapping.

Export—Move a disk platter and all volumes contained on that platter out of one diskpack.

Exposed—a volume is exposed to an operating system when the volume has an associated volume name (drive letter or volume mount point). The volume can then be made available to a file system or other data store.

Free agent drive—a disk drive which is not a member of a disk pack. Free agent drives cannot contain logical volumes that are exposed.

Health—volume fault management status. The status of a volume may be initializing, healthy, compromised, unhealthy, or rebuilding.

Healthy—containing or able to contain valid data.

Hot-spotting—temporary plexing of a volume or collection of volume extents.

Import—Move a disk platter and all volumes contained on that platter into one diskpack.

Initializing—a status indicating that a volume is rediscovering its volume configuration.

LBN—logical block number.

Logical block mapping—relationship between the logical-blocks exposed to the logical volume provider to those exposed by the same provider.

Logical volume provider—software which exposes logical volumes. A provider includes runtime services, configuration data, and management services.

Management service—software that performs volume configuration, monitoring or fault handling.

Mapped volume—a simple linearly logical block mapping which concatenates volumes to expose a single larger volume.

Mirrored volume—a logical volume which maintains two or more identical data copies. Also termed RAID 1.

Parity striped volume—a logical volume which maintains parity check information as well as data. The exact mapping and protection scheme is vendor-specific. Includes RAID 3, 4, 5, 6.

Plexed volume—a dynamic mirror volume. Plexing is used to create a copy of a volume rather than to provide fault tolerance. When plexing, the mirror copy is added to the volume with the intent of removal after the contents have been synchronized.

RAID—Redundant Array of Independent Disks.

Rebuilding—a status indicating that a previously compromised fault tolerant volume is resynchronizing all volume extent data.

Runtime service—software that executes on a per-IO request basis.

SCSI—Small-Computer Systems Interface.

Stacked volume—a volume that has been constructed by more than one logical block mapping operation. An example is a stripe set of mirror volumes. Stacking includes stripping, mapping, and plexing.

Striped volume—a logical block mapping which distributes contiguous logical volume extents across multiple volumes. Also termed RAID 0.

Unhealthy—a status indicating that a non-fault tolerant volume missing one or more disk or volume extents; data contained on unhealthy volumes must not be accessed.

Volume configuration stability—a status to denote whether a volume logical to physical mapping is undergoing change. A volume may be stable, extending, shrinking, plexing, or remapping.

Volume extent—a contiguous range of logical blocks contained on a volume. Volume extents are the smallest managed logical volume unit.

Volume status—a status to denote the current use of a volume by the system. A volume may be unused, hot spare, mapped, used, or unknown.

SYSTEM LEVEL OVERVIEW

A system level overview of the operation of an exemplary embodiment of the invention is described by reference to FIG. 2 and FIG. 3. The concepts of the invention are described as operating in a multiprocessing, multithreaded virtual memory operating environment on a computer, such as computer 20 in FIG. 1.

Figure 2:
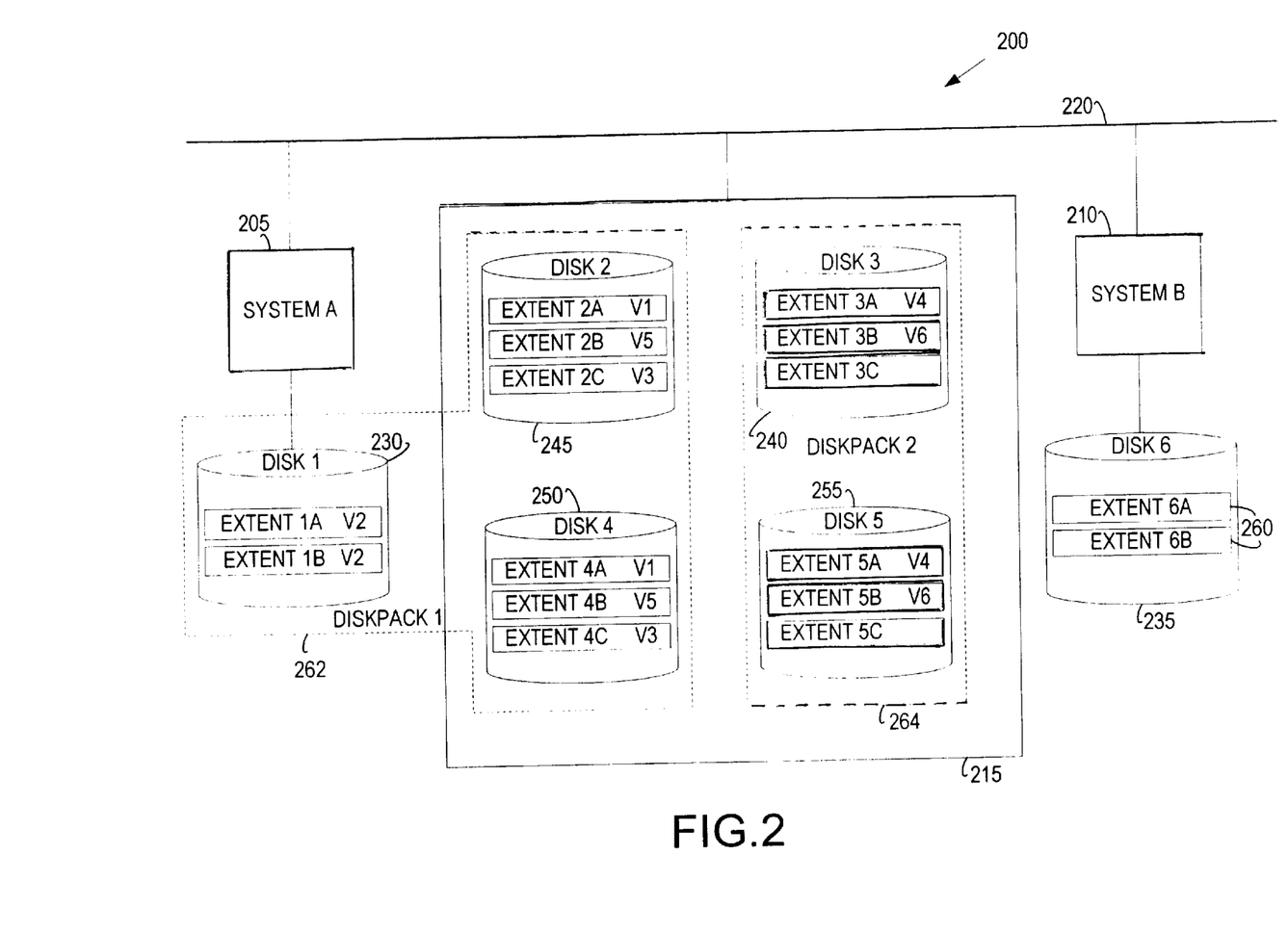
FIG. 2 is a diagram illustrating an exemplary disk storage configuration according embodiments of a volume migration system.

FIG. 2 is a diagram illustrating a hardware configuration used in exemplary embodiments of a volume migration system. Hardware configuration 200 includes computer systems 205 and 210, and disk cabinet 215, all communicatively coupled together via network 220. Computer systems 205 and 210 are computers with a variety of the components described above in reference to computer 20 and network 51 of FIG. 1. In an exemplary hardware configuration of an embodiment of the invention, computer systems 205 and 210 each have a disk operatively coupled to the system, disks 230 and 235 respectively.

Disk cabinet 215 is a peripheral containing a plurality of disks 240, 245, 250 and 255. A disk cabinet such as cabinet 215 is typically used to provide a large amount of storage to one or more computer systems.

Each of disks 230, 235, 240, 245, 250 and 255 have one or more extents 260. An extent is a contiguous storage address space instantiated by physical media such as a disk. An extent is characterized by its starting offset (in sectors) from the base of the disk media and its size. A disk can have a single extent that comprises the entire disk or some subset of the sectors on the disk. Alternatively, a disk can have a plurality of extents of varying sizes, with each extent covering a separate portion of the disk.

Extents are the basic building blocks used to construct volumes through a process called mapping. The allowable mappings are many-to-many: within one disk there may be extents that are parts of several volumes, and one volume can contain extents residing on several disks.

In general, there are five types of mappings of extents to volumes. The mapping types are as follows:

| | |
|---|---|
| Simple | The volume consists of a single physical extent. In this case the volume may occupy an entire disk or only a portion thereof. |
| Concatenation | The volume consists of at least two extents. The extents are joined in order. Concatenating two disks will yield a volume with size equal to the sum of the size of each extent; the first part of the volume address space resides on the first extent, the later part on the second. |
| Stripe without parity | The volume consists of at least two extents. Component pairs of extents must be of the same size. The extents are interleaved with size "I" (the "stripe width"). Striping two disks will again yield a volume with a size equal to the sum of the size of each extent. Volume addresses 0:I reside on the first disk addresses 0:I; volume addresses I + 1:2I reside on the second disk addresses 0:I; volume addresses 2I + 1:3I reside on the first disk addresses I + 1:2I; and so on. |

-continued

| | |
|---|---|
| | The purpose of striping is to achieve higher read/write data rates by scheduling concurrent I/O requests. |
| Mirroring | The volume consists of at least two extents. The extents fully replicate all data. Mirroring two, three, or more disks of equal size will yield a volume with size equal to that of a single extent. Loss of one disk does not cause any loss of data since there is at least one disk remaining. Any contributing disk may satisfy a read to a mirrored volume since the data is identical on each. A write to a mirrored volume causes writes to each contributing disk to ensure that the data remains identical. Mirroring is also sometimes referred to as "plexing." |
| Stripe with parity | Similar to stripe without parity, with the addition of an extent that maintains parity information. The parity information can be used to reconstruct a damaged or missing extent in the case of a disk failure. |

In addition, a volume may be constructed out of other component volumes. A volume constructed in this manner is called a stacked volume. An example of a stacked volume is a striped mirror. In the case of a striped mirror, a minimum of four extents is required. Extent pairs are mirrored to create two mirrored volumes. Those two volumes are then striped to create one stacked volume. That volume will have size equal to the stripe extents.

A number of the disks shown in system 200 have been organized into diskpacks. A diskpack is a set of logical volumes and the underlying disks on which the extents belonging to the volume reside. Diskpacks provide transitive closure for the volumes contained in the disk pack and may provide group sanity checking to ensure volume configuration correctness. A first diskpack 262 includes disks 230, 245 and 250. A second diskpack 264 includes disks 240 and 255.

The configuration described above with reference to FIG. 2 has been presented to illustrate an exemplary configuration in which the invention can operate. No embodiment of the invention is limited to the particular configuration described above, or to any particular number of disks, diskpacks, diskpack configurations, volumes, volume types or volume configurations.

Figure 3:
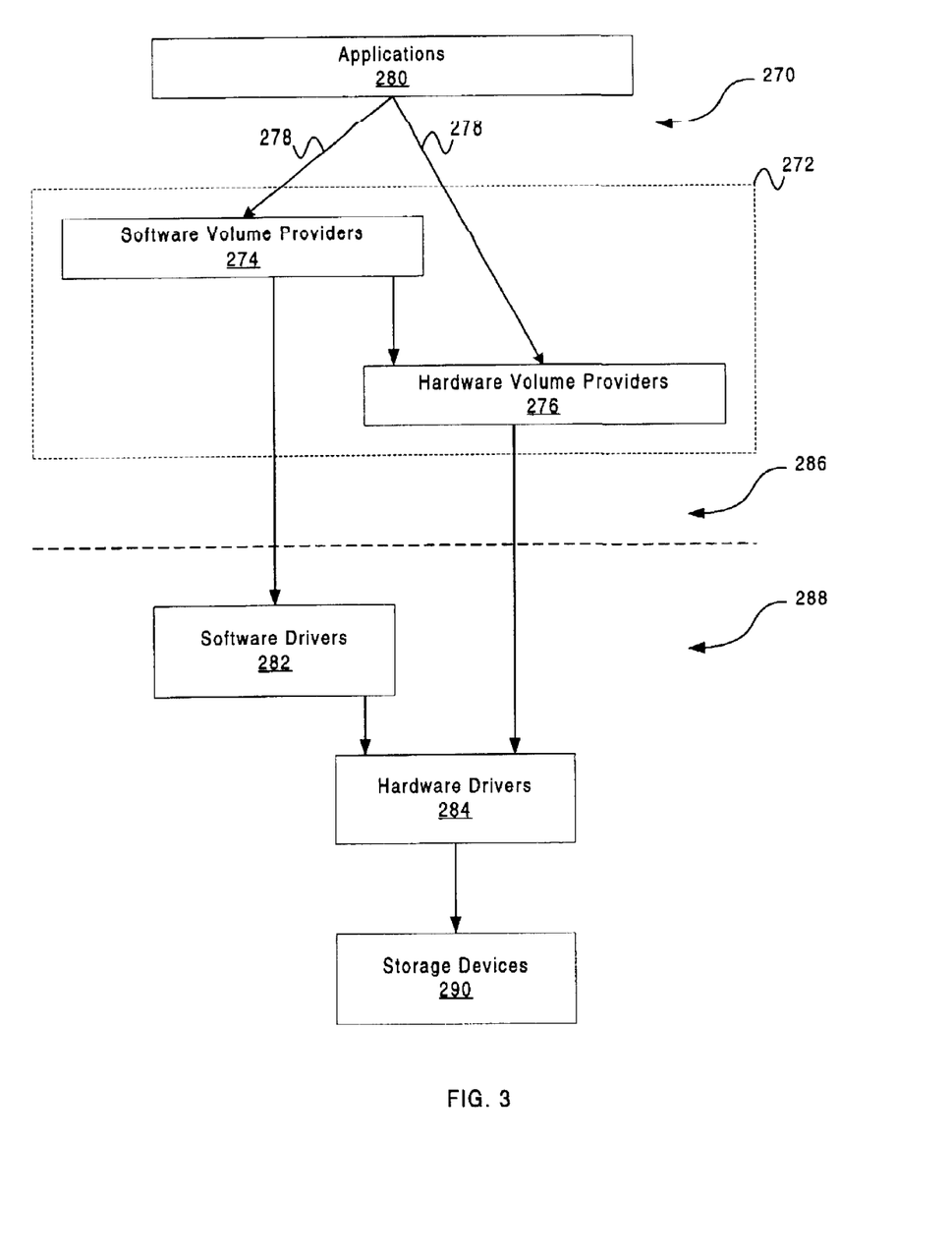
FIG. 3 is a diagram illustrating a system-level overview of exemplary embodiments of a volume migration system.

FIG. 3 is a block diagram illustrating a storage management software environment in which various embodiments of the invention operate. Storage management system 270 manages various volume providers 272 of storage cluster 200 (FIG.2) and includes Applications 280, software volume providers 274 and hardware volume providers 276 that execute in user space 286. Drivers 282 and 284 support run-time services that are provided by the operating system and execute in kernel space 288. Volume providers 272 perform all management tasks such as volume configuration, performance monitoring and dynamic event handling.

Each volume provider 272 within storage management system 270 has a corresponding hardware driver 284. In addition, a software volume provider 274 can either directly interface to a hardware volume provider 276 or can have a interface to a software driver 282. Drivers 282 and 284 handle all communications with storage devices 290 and can implement one of a variety of protocols such as SCSI ("Small-Computer Systems Interface"), IP ("Internet Protocol"), etc. Drivers 282 and 284 support the run-time services that are provided by the operating system.

According to the invention, volume providers 272 provide applications 280, such as administrative tools, management tools and migration tools, with a high-level, attribute-based view of storage devices 290. More specifically, applications 280 communicate storage access information to volume providers 272 via Application Programming Interface ("API") 278. The storage access information allows applications 280 to deal with storage devices 290 in a uniform or generic manner regardless of the vendor specific interfaces provided by the storage devices 290. For example, in one embodiment the storage access information includes volume configuration information such as storage device mappings.

Based on the storage access information, volume providers 272 perform all disk extent mapping, disk space allocation and mapping type selection. More specifically, volume providers 272 implement sophisticated configuration rules for configuring storage devices 290 based on the storage access information received from applications 280. Thus, API 278 allows applications 280 to manage volume providers 272 without requiring that applications 280 have detailed knowledge of their underlying policies or the physical characteristics of storage devices 290. In this manner, API 278 shields applications 280 from these complex, vendor-specific rules such that an administrator need not be an expert in logical volume management.

Although the volume providers 272 must conform to API 278, the invention places no restraints on how volume providers 272 communicate with the software drivers 282 or hardware drivers 284 and may use any preferred protocol. In this fashion, storage management system 270 requires no changes to conventional drivers 282 and 284. Thus, vendors of storage devices 290 are free to develop their own communication protocols.

In one embodiment of the invention, the above-described components operate to migrate, or export volumes from one diskpack to another. An application 280 such as an export program is initiated to export the a designated volume. The export program communicates with the logical volume providers 272 to determine which disks contain extents belonging to the designated volume.

The export program also communicates with the logical volume provider in order to determined if any other volumes have extents that reside on the same disk as the designated volume. If so, these volumes, referred to as friendly volumes, are also designated for export. The disk or set of disks containing the originally designated volume and the friendly volumes form what referred to as a "platter." A platter is the smallest number of disks that can contain the volume(s) and contains no extents contributing to other volumes. That is, given a diskpack, a platter is the smallest transitive closure of the extents that belong to the volumes present in the original diskpack.

The export program then determines if any undesignated volumes have extents that reside on the same disks as the newly designated volumes. If so, these undesignated volumes are designated as friendly volumes that are to be exported. The export process continues to search for platter members until no new friendly volumes are discovered, at which point the designated volume and the friendly volumes are exported from the original source diskpack to a different receiving diskpack.

Methods of an Exemplary Embodiment of the Invention

Figure 4:
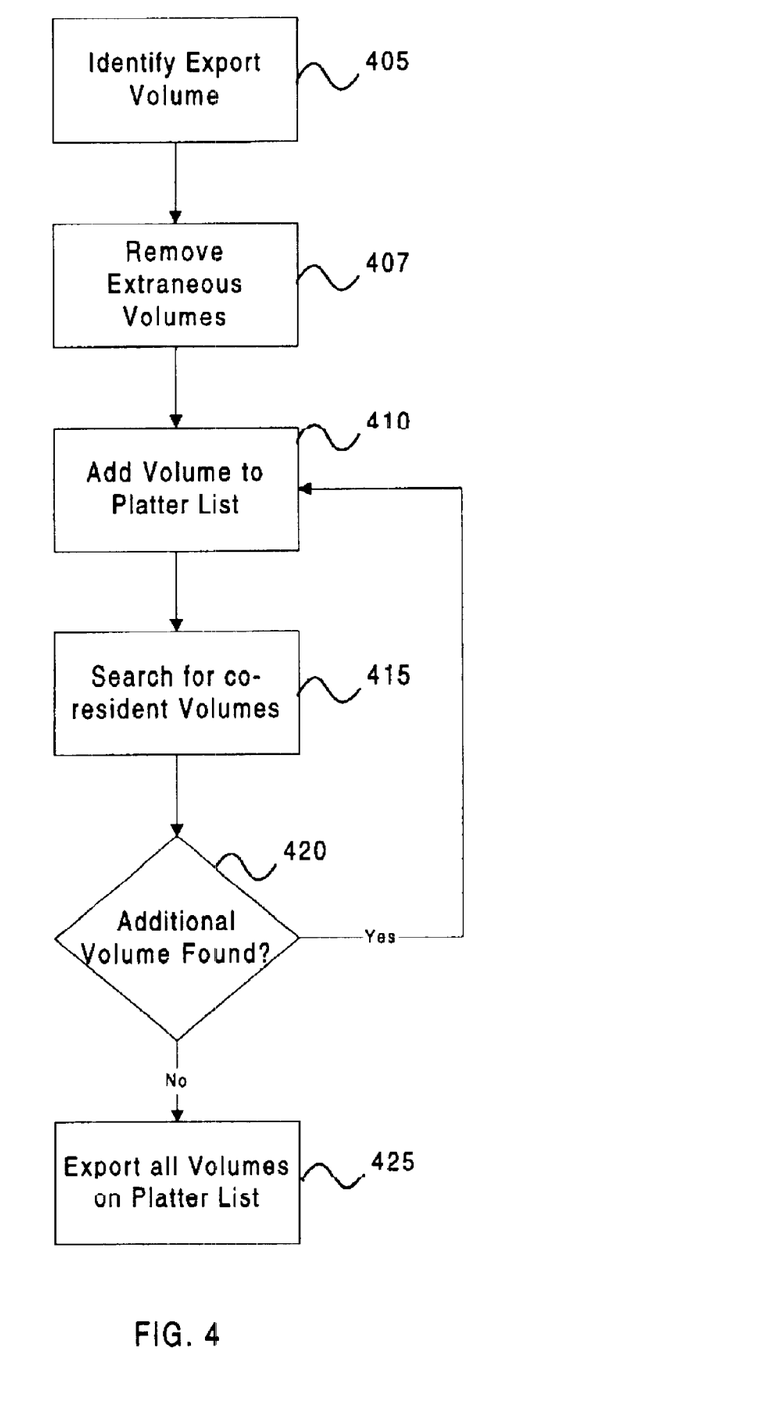
FIG. 4 is a flow diagram illustrating a method of performing volume migration according to an embodiment of the invention.

In the previous section, a system level overview of the operation of an exemplary embodiment of the invention was described. In this section, the particular methods of the invention performed by a operating environment executing an exemplary embodiment are described by reference to a flowchart shown in FIG. 4. The methods to be performed by the operating environment constitute computer programs made up of computer-executable instructions. Describing the methods by reference to a flowchart enables one skilled in the art to develop such programs including such instructions to carry out the methods on suitable computers (the processor of the computer executing the instructions from computer-readable media). The method illustrated in FIG. 4 is inclusive of the acts required to be taken by an operating environment executing an exemplary embodiment of the invention.

An export program executing a method of the invention begins by identifying a volume to export (block 405). The identification of a volume to export can be passed into the export program as a command line parameter, or it can be selected through a menu choice or icon selected by a user of a computer system. Alternatively, the identification can be based on the automatically export of a volume triggered by a scheduling program. The invention is not limited to any particular mechanism for determining the volume to export.

Next, the export program adds the disk or set of disks containing the volume's extents to a list of disks containing the volume or set of volumes to be exported (block 410). This list is referred to as the platter list. The platter list can be any data structure capable of containing disk identifiers, such as an array, linked list, stack, database table, etc. The export program executing the method then determines if there are any extents belonging to other volumes present on the same disk or disks as the initially identified volume to be exported. (block 415). If additional volumes are present (block 420), the export program adds the disks containing the newly discovered volumes to the platter list (block 410). These additional volumes are referred to as "friendly volumes". The search then broadens to determine if any further additional volume extents occupy the same disk as the friendly volumes added in the previous iteration of the search. If additional volume extents are discovered, the disks containing volumes that own the extents are added to the platter list.

The method proceeds in this manner until no additional friendly volumes are discovered that occupy disks currently on the platter list. The export program proceeds to export all of the volumes currently on the platter list, including both the initial identified volume and the friend volumes (block 425).

The export procedure removes the disks identified in the platter list from their current diskpack and associates the disks with a new diskpack. The act of associating the disks in the platter to the receiving diskpack is referred to as importing the platter. It is desirable that the exported platter retains association with the exporting diskpack until fully imported into the importing diskpack. As a result, disks on a platter are never free agent disks.

If an anomaly occurs during the export that causes a disk to become lost from a platter, it is desirable to consider the volume migration as having failed unless manually overridden. This behavior is an exception to the unconstrained transitive closure behavior of diskpacks, but is desirable because it protects against the silent (i.e. unreported and undetected) loss of data contained on any lost volumes.

In addition, it is desirable to allow for an import of a platter to cause reconfiguration of volumes contained in the platter. This is because logical volume extent size is common across a disk pack. In case of extent size mismatch, the extent size of the volumes on the platter must be dynamically resized to match that of the receiving diskpack.

Referring to the configuration shown in FIG. 2 as an example, assume that volume "V1" was identified as the initial volume to export. The search for additional volume extents would discover that volumes V3 and V5 have extents that occupy the same disks as the initially identified volume V1. As a result, any disk having an extent belonging to these volumes would be added to the platter list. Thus disks 245 and 250, having extents belonging to the newly discovered volumes, would be searched for further additional volume extents belonging to volumes not currently on the export list.

Volumes V2, V4 and V6 would not be discovered, as they do not have extents that occupy a disk shared by extents belonging to initially identified volume V1, or any of the friend volumes V3 and V5. As a result, the exported volumes would be V1, V3 and V5, and the platter would comprise disks 245 and 250 of diskpack 262. Disk 230 of diskpack 262 would not be included in the platter, as it does not have any volume extents residing on disks that have volume extents belonging to the designated volume VI, or any of the friend volumes of V1 (V5 and V3).

In an alternative embodiment of the invention (not shown), extraneous friendly volumes having extents that occupy the same disk as an initially identified volume are migrated from the shared disks prior to performing the export. This allows the export to contain only a minimal volume or set of volumes, allowing the export to save both export media space and to save time in performing the export.

In a further alternative embodiment of the invention, it is desirable to compact the source volume prior to export. In order to compact the source volume, the extents that comprise the volume are replicated to a disk or set of disks which have no extents contributing to other volumes. This allows the disk platter list created as described above with reference to FIG. 4 to contain a minimal number of disks.

A method for performing on-demand volume export has been described. The method has been shown by reference to a flowchart including all the steps from 405 until 420. The method provides an efficient mechanism for exporting a volume or a set of volumes from a source diskpack and importing the volume or set of volumes into a receiving diskpack.

CONCLUSION

Systems and methods for performing an on-demand determination of a correct set of volumes to be exported have been described. A disk platter is defined to be the unit of volume migration. The system and methods described provide advantages not found in previous systems. A flexible unit of export, the disk platter, is automatically determined by identifying a volume to be exported. The systems and methods of embodiments of the invention insure that the disk platter maintains transitive closure. The disk platter is created on-demand, and is created automatically, thereby relieving the user of the responsibility of specifically identifying the disks to be exported. A user need only identify the logical volume that is to be exported. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, those of ordinary skill within the art will appreciate that while the migration of volumes has been described, other disk entities, such as disk partitions, could be migrated. The terminology used in this application with respect to volume migration is meant to include all of these environments. Therefore, it is manifestly intended that this invention be limited only by the following claims and equivalents thereof.

We claim:

1. A computerized method for exporting transitively related volumes in a system having multiple storage disks, each volume residing on one or the more multiple storage disks, comprising;

(a) identifying a volume for exportation;
    (b) adding each disk resided on by the identified volume to a platter list;
    (c) determining whether the disks in the platter list include previously unidentified volumes;
    (d) if the disks in the platter list include previously unidentified volumes, identifying the previously unidentified volumes, adding all disks resided on by the previously unidentified volumes to the platter list, and repeating steps (c) and (d); and
    (e) if the disks in the platter list do not include previously unidentified volumes, exporting all identified volumes.

2. The computerized method of claim 1, wherein exporting the volumes comprises removing the disks on the platter list from a source diskpack and adding the disks on the platter list to a receiving diskpack.

3. The computerized method of claim 1, wherein exporting the volumes comprises copying the volumes to an archive media.

4. The computerized method of claim 1, wherein determining whether the disks in the platter list include previously unidentified volumes comprises determining whether extents belonging to volumes not previously identified occupy the disks in the platter list.

5. The computerized method of claim 1, wherein the volumes contain data comprising a file system.

6. The computerized method of claim 1, wherein the volumes contain data comprising a database.

7. A computer-readable medium having computer-executable instructions for performing a method of exporting transitively related volumes, comprising:

(a) identifying a volume for exportation;
    (b) adding each disk resided on by the identified volume to a platter list;
    (c) determining whether the disks in the platter list include previously unidentified volumes;
    (d) if the disks in the platter list include previously unidentified volumes, identifying the previously unidentified volumes, adding all disks resided on by the previously unidentified volumes to the platter list, and repeating steps (c) and (d); and
    (e) if the disks in the platter list do not include previously unidentified volumes, exporting all identified volumes.

8. The computer-readable medium of claim 7, wherein exporting the volumes comprises removing the disks on the platter list from a source diskpack and adding the disks on the platter list to a receiving diskpack.

9. The computer-readable medium of claim 7, wherein exporting the volumes comprises copying the volumes to an archive media.

10. The computer-readable medium of claim 7, wherein determining whether the disks in the platter list include previously unidentified volumes comprises determining whether extents belonging to volumes not previously identified occupy the disks in the platter list.

11. The computer-readable medium of claim 7, wherein the volumes contain data comprising a file system.

12. The computer-readable medium of claim 7, wherein the volumes contain data comprising a database.

13. A computerized method for exporting volumes from a first disk pack to a second disk pack, comprising:

receiving a request to export a first volume from the first disk pack, identifying each volume in the first disk pack that is transitively related to the first volume via friendliness;

exporting the first volume and all identified volumes to the second disk pack;

storing in a platter list an identifier for each disk in the first disk pack that has residing thereon an extent belonging to the first volume; and storing in a platter list an identifier for each disk in the first disk pack that has residing thereon an extent belonging to an identified volume.

* * * * *

UNITED STATES PATENT AND TRADEMARK OFFICE
CERTIFICATE OF CORRECTION

PATENT NO. : 6,684,231 B1
DATED : January 27, 2004
INVENTOR(S) : Cabrera et al.

It is certified that error appears in the above-identified patent and that said Letters Patent is hereby corrected as shown below:

Column 2,
Line 33, delete "a-system" and replace with -- a system --

Column 3,
Line 7, delete "source-diskpack" and replace with -- source diskpack --

Column 4,
Line 33, delete "computer may be" and replace with -- computer 20 may be --

Column 5,
Line 27, delete "FIG. 11" and replace with -- FIG. 1 --

Column 11,
Line 19, delete "VI" and replace with -- V1 --

Column 12,
Line 9, delete "comprising;" and replace with -- comprising: --

Column 13,
Line 8, delete "disk pack," and replace with -- disk pack; --

Signed and Sealed this

Twenty-second Day of June, 2004

JON W. DUDAS
*Acting Director of the United States Patent and Trademark Office*